UNITED STATES PATENT OFFICE 2,274,218

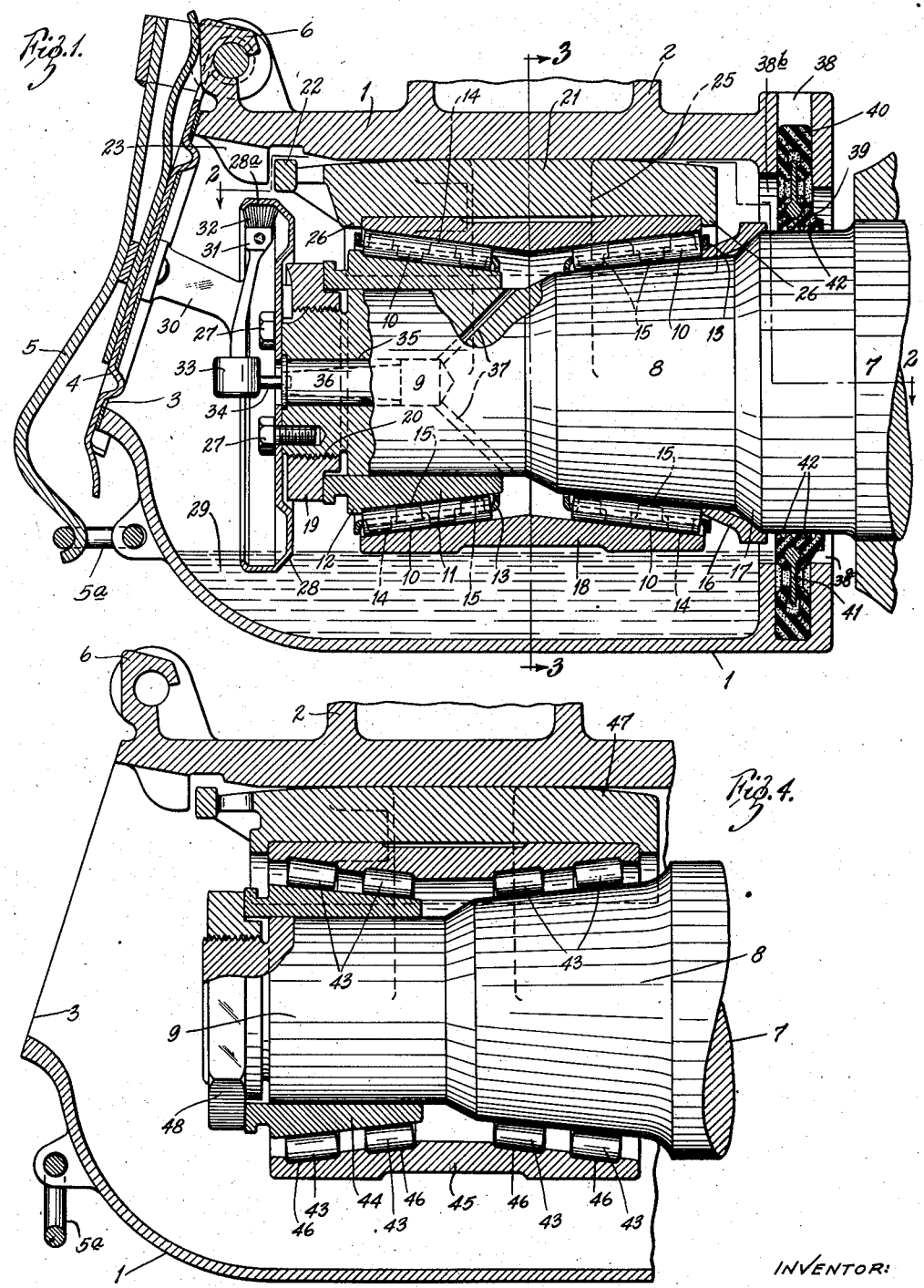

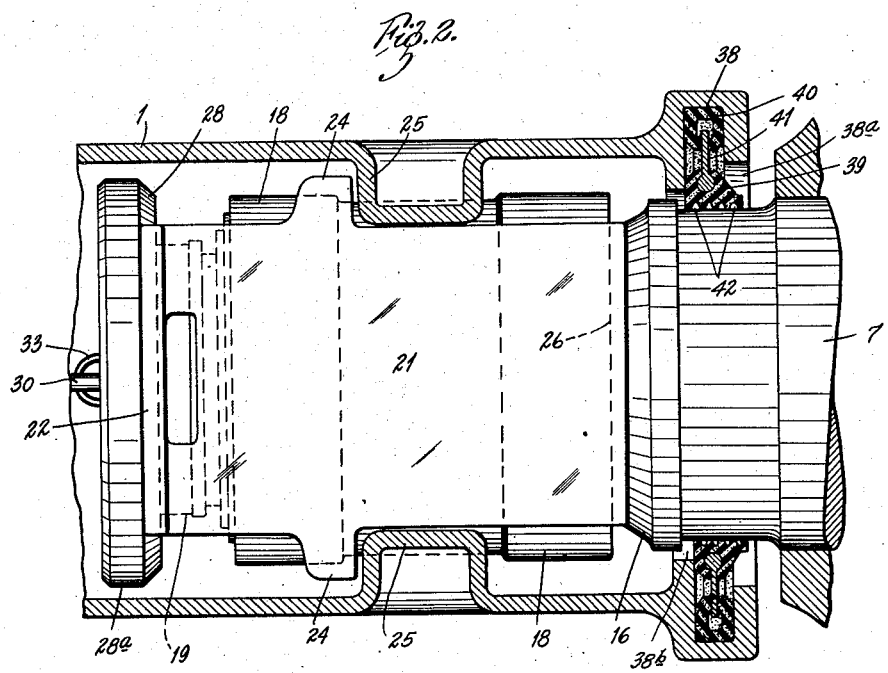
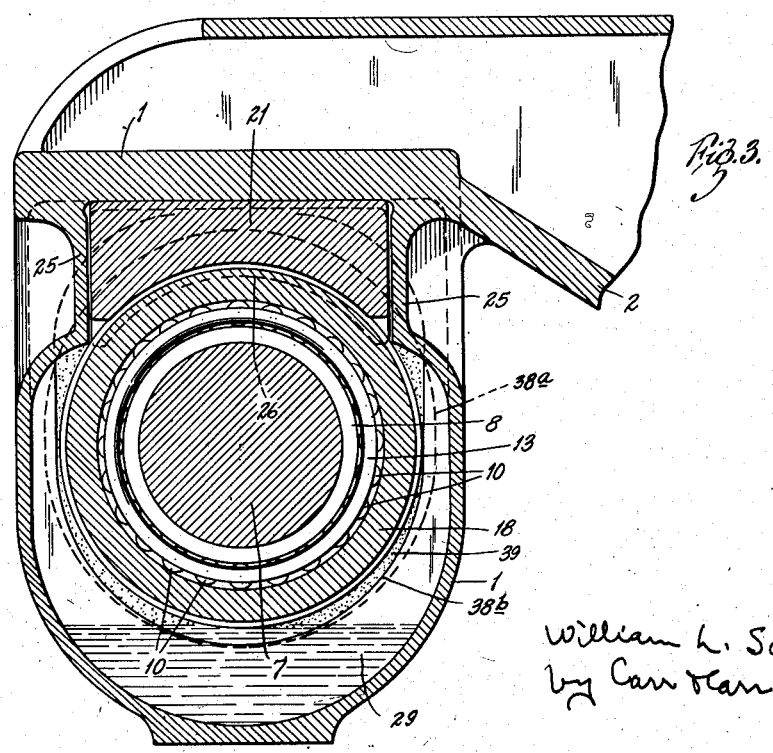

ROLLER BEARING AXLE CONSTRUCTION

William L. Scribner, Canton, Ohio, assignor to The Timken Roller Bearing Company, Canton, Ohio, a corporation of Ohio Application February 2, 1940, Serial No. 316,922

4 Claims. (Cl. 308—180)

Heretofore, all attempts to replace the plain bearings used in standard A. A. R. journal boxes with anti-friction bearings of tapered roller bearing type have failed. These standard A. A. R. journal boxes are designed for plain bearings only, which consist of a wedge member and a bearing brass that makes an arcuate contact with the upper surface only of the axle journal. In contrast thereto, the anti-friction bearings of the roller bearing type extend completely around the journal.

A standard A. A. R. journal box is a one-piece box with a rectangular opening at the outermost end for a cover member and an oval-shaped opening at the innermost end for the insertion of an axle journal. The size of these openings have heretofore made it impossible to use anti-friction bearings of the tapered roller type with such standard A. A. R. journal boxes. Therefore, to utilize roller bearings on a railway axle journal, it has been necessary to replace the standard A. A. R. journal box with a special journal box adapted to accommodate such roller bearings.

This invention relates to roller bearing axle constructions for journal boxes and, more particularly, to roller bearing axle constructions for standard A. A. R. journal boxes. It has for its principal object to provide a simple and inexpensive roller bearing axle construction to replace the plain bearing constructions now used with standard A. A. R. journal boxes. Particular objects are to provide a roller bearing having a cup whose outside diameter is smaller than the smaller dimension of the oval-shaped openings in the rear or innermost end of the A. A. R. journal box to permit insertion therethrough, to provide a wedge, which wedge has an upper or outer surface fitting in such A. A. R. journal box and a lower or inner surface for receiving said cup and to provide an axle shape which may be formed by refinishing present standard A. A. R. axles. Additional objects are to provide a simple yet efficient lubricating device for the roller bearing axle construction and to provide for the retention of lubricant within the journal box.

The invention consists principally in the bearing axle construction and in the parts, combinations and arrangements of parts hereinafter described and claimed.

The lubricating arrangement disclosed but not claimed in the specification is covered by an application for Lubricating device filed February 2, 1940, and having Serial No. 316,921, now matured into Patent No. 2,241,870, issued May 13, 1941.

In the accompanying drawings, wherein like reference numerals refer to like parts wherever they occur, Fig. 1 is a longitudinal sectional view of a railway car axle construction embodying my invention;

Fig. 2 is a plan view of a railway car axle construction embodying my invention;

Fig. 3 is a view taken on line 3—3 in Fig. 1; and

Fig. 4 is a longitudinal sectional view illustrating a modification of the invention.

In the drawings is shown a standard A. A. R. journal box 1 whose parts and dimensions conform to the standards established by the Association of American Railways and whose upper portion is integral with a truck side frame member 2. The outer end of the journal box is provided with an opening 3 and with a closure cap 4 therefor, said closure cap being secured in position by means of a clamp spring member 5 whose lower end is held by a loop 5a secured to said journal box. The top of the journal box is provided at its outer end with a lug 6 of the kind commonly used for hingedly securing present standard closure caps to the journal box; so that hinged caps of the present type may be used, if desired. The lug 6 supports the upper end of the cap 4 which is hingedly mounted thereon.

Projecting into the journal box through oval-shaped openings 38a and 38b in the innermost end of the journal box is the reduced end portion or journal of an axle 7. The journal portion comprises a tapered innermost portion 8 and a cylindrical outermost portion 9 of considerably smaller diameter than the main axle portion. Special axles may be used or ordinary axles may be machined to provide the tapered portion which is fire hardened or hardened by any other suitable means.

Mounted on the reduced end portion or journal of the axle is an anti-friction bearing, preferably a tapered roller bearing. In the construction illustrated, the bearing shown comprises two series of conical rollers 10. A bearing cone or inner raceway member 11 having a thrust rib 12 at its large end is provided on the outermost portion 9 of the journal for the outermost series of rollers, the large ends of which abut against the thrust rib. The tapered portion 8 of the axle journal serves as an inner raceway member for the innermost series of rollers. Suitable cages 13 having outturned flaps 14 and inturned flaps 15 are provided for the rollers whereby each cage and its rollers are self-contained. The innermost rollers abut against a spacing ring 16 mounted against a shoulder 17 on the axle. The rollers are thus held in position between the thrust rib and the spacing ring. A double cup 18 having two bore portions tapering toward the middle to constitute conical raceways is provided for the rollers.

The cone on the outermost portion of the journal abuts against and is held by a locking and adjusting nut 19 mounted on the threaded end 20 of the axle.

Interposed between the bearing and the journal box is a wedge 21 having a thrust end portion 22 adapted to cooperate with the usual lug 23 depending from the under surface of the top of the journal box near the outermost end of said wedge. Thrust ribs 24 extend outwardly on either side of the wedge to cooperate with central thrust ribs 25 extending from the journal box. The wedge has downwardly extending projections 26 adapted to retain the bearing cup.

Secured to the end of the axle by screws 27 is a thin dish-shaped member 28 whose lower portion extends into the oil 29 in the bottom of the journal box. A bracket 30 having a collector brush 31 preferably integral therewith is welded or fastened by other suitable means to the journal box cap. Preferably, this brush has brass wire bristles 32 adapted to sweep the rim 28a of the dish-shaped member and collect oil therefrom. Secured to the lower end of the brush and preferably integral therewith is an oil box or reservoir 33 having a small pipe 34 extending therefrom. The pipe extends into a horizontal bore 35 in the central portion of the axle. A supporting sleeve 36 is positioned in this bore. Openings 37 leading from the central bore communicate with oil spaces between the rollers.

To retain the lubricant in the journal box, the innermost end of the journal box is double walled and a space 38 is provided between the walls to receive a closure member. The closure member comprises an inner ring 39 and an outer concentric ring 40 of neoprene or similar elastic material connected by a metal ring 41 of any suitable material. The closure member seats on the shoulder of the axle and grooves 42 in the inner elastic ring 39 are adapted to prevent the escape of oil.

The herein described construction has made it possible to utilize roller bearing in present day standard A. A. R. journal boxes. The special bearing and wedge may be inserted through the oval-shaped openings 38a and 38b in the innermost end of the journal box, and the special axle permits the mounting of the roller bearing in the journal box.

The operation of the lubricating device is as follows; the axle 7 rotates thereby turning the dish-shaped member 28 secured to the end thereof. Oil is collected and carried around to the brush 31 whose bristles 32 sweep the oil therefrom. The oil then runs down the brush by gravity and into the box 33. The pipe 34 leading from the box carries oil to the bore 35 and centrifugal force flings the oil through the openings 37 leading to the oil space between the bearings.

The bracket arm 30 is secured to the cap 4 and when the cap is raised to oil or inspect the journal box, the collector unit is moved out of the way.

In the construction illustrated in Fig. 4, a modification of the hereinbefore described construction is shown. In the modification, the bearing comprises four series of conical rollers 43. A bearing cone or inner raceway member 44 without a thrust rib is positioned on the cylindrical outermost portion 9 of the journal. The tapered portion 8 of the journal serves also as an inner raceway member. Two series of tapered rollers are mounted on the bearing cone and two series on the tapered portion of the axle journal. A bearing cup or outer raceway member 45 having annular recesses 46 therein is provided for the rollers, each series of rollers being held in a recess in the cup. In this construction, cages for the rollers are eliminated.

A wedge 47 similar to that described above is interposed between the top of the journal box and the bearing. The cone on the outer most portion of the journal abuts against and is held by a locking and adjusting nut 48 mounted on the threaded end of the axle.

The hereinbefore described lubricating arrangement or any other suitable lubricating arrangement may be used to lubricate the bearing.

The construction herein described have numerous advantages. Anti-friction bearings of roller type may be applied to a standard journal box instead of requiring a special journal box as has heretofore been necessary. The plain bearings of cars now in use may be replaced by these roller bearings. My lubricating arrangement is simple and efficient and insures proper lubrication at all times. Increased rotative speed of the axle increases the rotative speed of the dish and additional oil is supplied thereby. Centrifugal force insures a sufficient amount of oil reaching the bearing.

Obviously, the invention herein described admits of considerable modification and I do not wish to be limited to the precise constructions shown.

What I claim is:

1. A car axle construction comprising an axle having a tapering portion and a reduced cylindrical portion extending beyond said tapering portion, a one-piece journal box into which said axle extends, the vertical section of said box being generally of elongated U-shape with a closed top, said journal box having restricted openings in both ends of smaller vertical and horizontal dimensions than the inside of said box, a roller bearing mounted on said axle, said bearing comprising a bearing cone mounted on said cylindrical portion of said axle, bearing rollers being mounted on said cone and on said tapered axle portion, respectively, a cup having raceway portions for said rollers, a wedge interposed between said cup and the top of said journal box, said wedge having downwardly extending flanges for engaging the ends of said cup, and securing means for retaining said bearing on said axle.

2. A car axle construction comprising an axle having a tapering portion and a reduced cylindrical portion extending beyond said tapering portion, a one-piece journal box into which said axle extends, the vertical section of said box being generally of elongated U-shape with a closed top, said box having restricted openings in both ends of smaller vertical and horizontal dimensions than the inside of said box, said box having central thrust ribs extending inwardly from the sides of said box, a roller bearing mounted on said axle, said bearing comprising a bearing cone mounted on said reduced cylindrical portion of said axle, bearing rollers being mounted on said cone and on said tapered axle portion, respectively, a cup having raceway portions for said rollers, a wedge interposed between said cup and the top of said rollers, said wedge having downwardly extending flanges for engaging the ends of said cup and having ribs extending outwardly on each side of said wedge being adapted to cooperate with said central thrust ribs of said journal box, and means for retaining said bearing on said axle.

3. A car axle construction comprising an axle having a tapering portion, a reduced cylindrical portion extending beyond said tapering portion and a threaded end portion, a one-piece journal box into which said axle extends, the vertical section of said box being generally of elongated U-shape with a closed top, said journal box having restricted openings in both ends of smaller vertical and horizontal dimensions than the inside of said box, said box having central thrust ribs extending inwardly from the sides of said box, a roller bearing mounted on said axle, said bearing comprising a bearing cone mounted on said reduced cylindrical portion of said axle, a series of bearing rollers mounted on said cone and another series of bearing rollers being mounted on said tapered axle portion, cages for said series of rollers, a cup having raceway portions for said rollers, a wedge interposed between said cup and the top of said journal box, said wedge having downwardly extending projections for engaging the ends of said cup, and having ribs extending outwardly on each side of said wedge, said ribs being adapted to cooperate with said central thrust ribs of said journal box, and a threaded nut on said threaded end of said axle.

4. A car axle construction comprising an axle having a tapering portion and a portion extending beyond said tapering portion, a one-piece journal box into which said axle extends, the vertical section of said box being generally of elongated U-shape with a closed top, said journal box having restricted openings in both ends of smaller vertical and horizontal dimensions than the inside of said box, a roller bearing mounted on said axle comprising two series of bearing rollers, one of said series of bearing rollers being mounted on said tapered axle portion, a cup having raceway portions for said rollers, a wedge interposed between said cup and the top of said journal box, said wedge having downwardly extending flanges for engaging the ends of said cup, and securing means for retaining said bearing on said axle.

WILLIAM L. SCRIBNER.